United States Patent

[11] 3,619,653

| [72] | Inventors | Herbert Poppinger;<br>Manfred Liska, both of Munich, Germany |
|---|---|---|
| [21] | Appl. No. | 845,722 |
| [22] | Filed | July 29, 1969 |
| [45] | Patented | Nov. 9, 1971 |
| [73] | Assignee | Siemens Aktiengesellschaft<br>Berlin, Germany |
| [32] | Priority | Aug. 1, 1968 |
| [33] | | Germany |
| [31] | | P 17 63 751.3 |

[54] PULSE GENERATOR FOR PRODUCING A SYNCHRONOUS PULSE SEQUENCE WITH ALTERNATING VOLTAGE OF ADJUSTABLE PHASE ANGLE
8 Claims, 3 Drawing Figs.

[52] U.S. Cl. .................................................. 307/252 B,
307/252 N, 307/252 Q, 307/262, 307/265,
307/269

[51] Int. Cl. .................................................. H03k 17/00
[50] Field of Search .................................... 307/252.21,
228, 262, 265, 208, 209; 328/28, 63, 74

[56] References Cited
UNITED STATES PATENTS

| 3,183,372 | 5/1965 | Chin .............................. | 307/269 X |
| 3,329,837 | 7/1967 | Hewie ............................ | 307/262 |

*Primary Examiner*—Donald D. Forrer
*Assistant Examiner*—John Zazworsky
*Attorneys*—Curt M. Avery, Arthur E. Wilfond, Herbert L. Lerner and Daniel J. Tick ABSTRACT: A pulse generator comprises a circuit arrangement including first and second transistors, five diodes, a capacitor and a plurality of resistors. The pulse generator produces a synchronous pulse sequence with alternating voltage and adjustable phase angle and drives a Triac. The Triac is connected through a load to a source of alternating voltage.

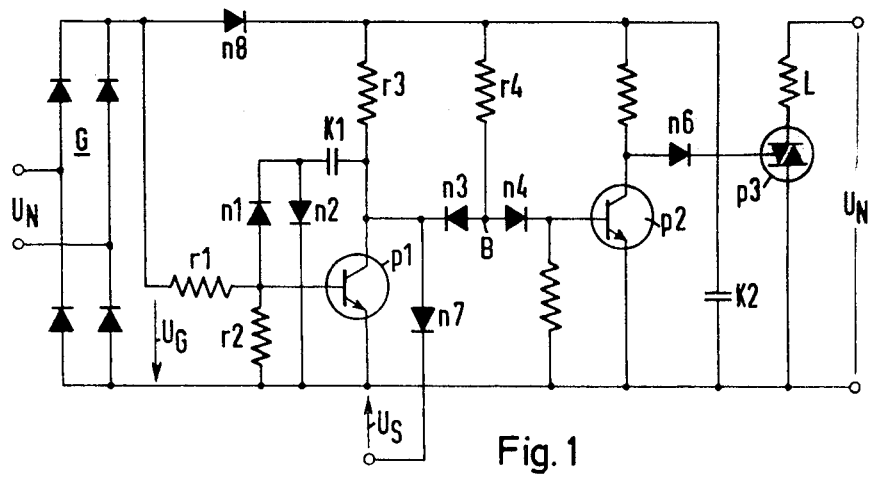
Fig. 1
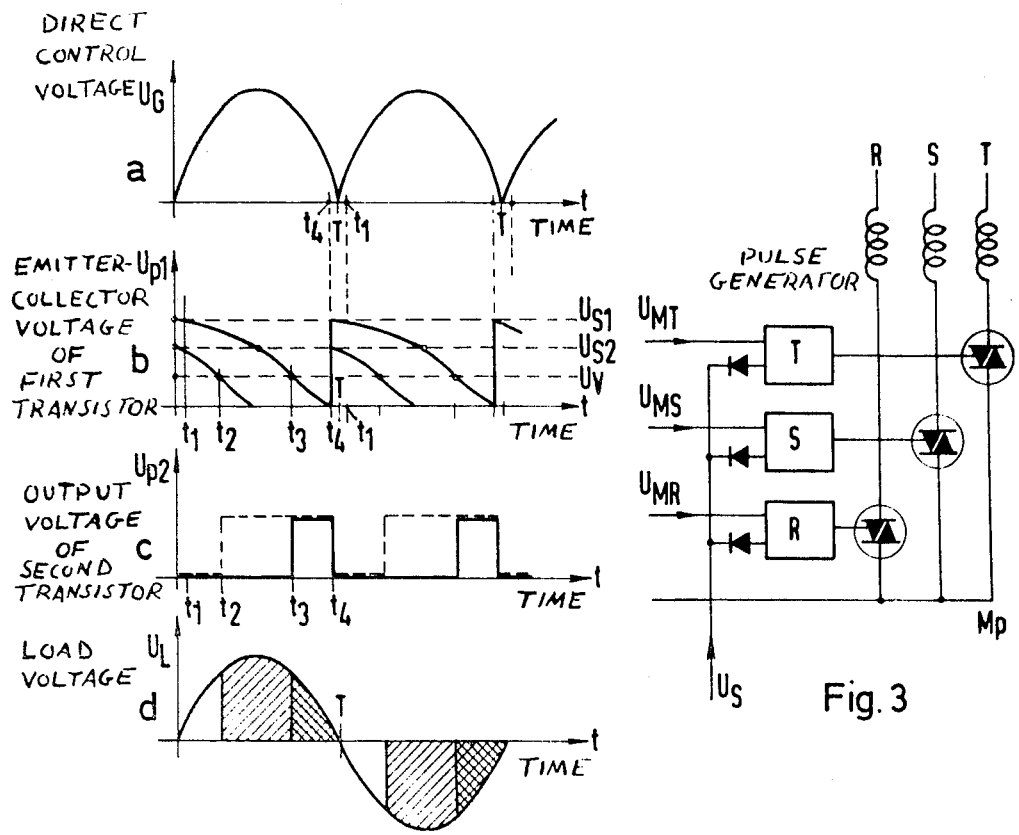
Fig. 2
Fig. 3

PULSE GENERATOR FOR PRODUCING A SYNCHRONOUS PULSE SEQUENCE WITH ALTERNATING VOLTAGE OF ADJUSTABLE PHASE ANGLE

The present invention relates to a pulse generator. More particularly, the invention relates to a pulse generator for producing a synchronous pulse sequence with alternating voltage and adjustable phase angle.

The pulse generator of the present invention includes a capacitor which is charged by a DC voltage and is periodically discharged via a first transistor. The capacitor is connected to a control voltage source which delivers an adjustable reference voltage having a magnitude which determines the instant that a second transistor is switched to its nonconductive condition, relative to the alternating voltage, whereby the pulse sequence is provided at the emitter-collector path of said second transistor.

In a known pulse generator of this type, a difference voltage between the capacitor voltage and the adjustable reference voltage is provided. The difference voltage is applied to the control path of the second transistor. The second transistor is then switched to its nonconductive condition when the capacitor voltage exceeds the reference voltage. The capacitor is discharged during each period of the alternating voltage, whereupon the second transistor is again switched to its conductive condition. Voltage pulses thus appear in the emitter-collector path of the second transistor. The frequency of such voltage pulses depends upon the frequency of the alternating voltage.

A disadvantage of the known pulse generator of the aforedescribed type is that the second transistor cannot be switched to its nonconductive condition instantaneously. This is due to the fact that the difference voltage changes at a relatively slow rate during the charging of the capacitor. The voltage pulses in the emitter-collector path of the second transistor therefore have a relatively slight gradient, which is undesirable for control purposes, for example. Furthermore, a control voltage source is required for this purpose, which has no relation to the remainder of the circuit other than the two terminals. This means, for example, that the reference voltage cannot be derived from the direct voltage which energizes the remainder of the circuit.

The principal object of the present invention is to provide a new and improved pulse generator.

An object of the present invention is to provide a new and improved pulse generator for producing a synchronous pulse sequence with alternative voltage and adjustable phase angle.

An object of the present invention is to provide a pulse generator which overcomes the disadvantages of known pulse generators of similar type.

An object of the present invention is to provide a pulse generator which utilizes two transistors to provide pulses having steep leading and trailing edges.

An object of the present invention is to provide a pulse generator which utilizes two transistors to provide pulses having steep leading and trailing edges at phase positions which vary with a reference voltage derived from the energizing voltage of the pulse generator.

An object of the present invention is to provide a pulse generator for producing a synchronous pulse sequence with alternating voltage and adjustable phase angle with efficiency, effectiveness and reliability.

In accordance with the present invention, a pulse generator for producing a synchronous pulse sequence with alternative voltage and adjustable phase angle comprises a first capacitor connected in series circuit arrangement with a first diode. A first transistor has emitter, collector and base electrodes, a control path and an emitter-collector path connected in parallel with the series circuit arrangement. A first resistor is connected to a common point in the connection between the series circuit arrangement and the emitter-collector path of the first transistor. The first diode has a polarity whereby the first capacitor is charged through the first resistor when the first transistor is in its nonconductive condition. A second diode is connected in series circuit arrangement with a second resistor. Such series circuit arrangement is connected in parallel with the first diode. The second diode has a polarity whereby the first capacitor may discharge through the second diode, the second resistor and the emitter-collector path of the first transistor. A source of unidirectional control voltage and the second resistor are connected in parallel with the control path of the first transistor. The source of control voltage provides a rippled control direct voltage from a source of alternating voltage.

The emitter-collector path of the first transistor is connected to a source of a reference direct voltage in parallel through the third diode. The third diode has a polarity whereby the voltage to which the first capacitor will charge is limited to the magnitude of the reference direct voltage. A fourth diode is connected in series circuit arrangement with the control path of a second transistor having emitter, collector and base electrodes and a control path. The fourth diode passes a control current for switching the second transistor to its nonconductive condition. The emitter-collector path of the first transistor is connected to the last-mentioned series circuit arrangement in parallel through a fifth diode. The fifth diode has a polarity whereby the control current will drain off through the fifth diode when the emitter-collector voltage of the first transistor is less than a specific magnitude determined by the threshold magnitude of the fourth diode and the control path of the second transistor.

The pulse generator of the present invention is preferably utilized as a control unit for controllable semiconductor components which are connected via a load to a source of alternating voltage. More particularly, the pulse generator controls a Triac, which is a controllable semiconductor component manufactured by the General Electric Company. A Triac differs from a thyristor in that a flow current may be controlled in both directions by control pulses delivered to the same terminals. A Triac is described on pages 9, 14, 107, 122, 147, 187, 330, and 393 of the SCR manual of the General Electric Company, Fourth Edition, 1967.

In order that the present invention may be readily carried into effect, it will now be described with reference to the accompanying drawing, wherein:

FIG. 1 is a circuit diagram of an embodiment of the pulse generator circuit of the present invention;

FIG. 2 is a graphical presentation of the voltage at different points of the circuit arrangement of FIG. 1; and FIG. 3 is a block diagram of an AC controller comprising three pulse generators of the type of FIG. 1.

The pulse generator of FIG. 1 comprises a first transistor p1 having an emitter-collector path connected in parallel with the series circuit connection of a first capacitor K1 and a first diode n2. The series circuit arrangement is also connected, via a relatively low-ohmic first resistor r3, to a source of DC voltage. The DC voltage source comprises a rectifier arrangement G, a diode n8 and a second storage capacitor K2.

The diode n2 is connected in parallel with the series circuit arrangement of a second diode n1 and a second resistor r2. The second diode n2 is connected with a polarity which is such that the first capacitor K1 may discharge via the emitter-collector path of the first transistor p1, the diode n1 and the resistor r2, when said transistor is in its conductive condition. The control path of the transistor p1 is connected, via the resistor r1 and the rectifier arrangement G, to a source $U_N$ of alternating voltage.

The control path of the transistor p1 is also connected to the resistor r2. The resistor r2 is relatively high-ohmic, or of high-resistance value, so that the discharge time of the capacitor K1 is long compared to its charge time. The emitter-collector path of the transistor p1 is connected, via a diode n7, to a control voltage source which provides an adjustable reference voltage $U_S$. The reference voltage $U_S$ may be tapped by a variable voltage divider which may be connected in parallel with the storage capacitor K2.

The emitter-collector path of a second transistor p2 is connected, via a resistor, to the DC voltage source. The emitter-collector path of the second transistor p2 is also connected, via a diode n6, to the control path of a Triac p3. The control path of the second transistor p2 is supplied with a control current via a resistor r4 and a fourth diode n4. The control current switches the second transistor p2 to its conductive condition. A fifth diode n3 is connected between the common connection of the resistor r4 and the diode n4 and the collector electrode of the first transistor p1.

A load L is connected to the source $U_N$ of AC voltage via the load path of the Triac p3. The source $U_N$ of AC voltage is the same as that to which the rectifier arrangement G is connected.

Curve a of FIG. 2 shows the direct control voltage $U_G$. The abscissa of each of the curves a, b, c and d of FIG. 2 represents time t. The ordinate of curve a of FIG. 2 represents the direct control voltage $U_G$. The direct control voltage $U_G$ is applied to the control path of the first transistor p1 via the resistor r1.

The direct control voltage $U_G$ comprises the rippled direct voltage which is derived from the synchronized alternating voltage $U_N$ via full-wave rectification. With the exception of a small range, extending from the time $t_4$ to the time $t_1$, during which the control voltage is zero or close to zero, said control voltage is sufficiently high to control the first transistor p1 via the resistor r1.

Curve b of FIG. 2 illustrates the emitter-collector voltage $U_{p1}$ of the first transistor p1, as represented by the ordinate. The reference voltage $U_S$ and the capacitor voltage $U_V$ are also shown in the curve b of FIG. 2. The reference voltage $U_S$ is a controllable direct voltage. The capacitor K1 may be charged via the resistor r3 from the instant t4 until the magnitude of the reference voltage $U_S$ is reached.

The resistor $r_3$ has a resistance which is such that the charging period of the capacitor K1 is very short, relative to the duration of a half period of the alternating voltage $U_N$. The transistor p1 is again switched to its conductive condition at the instant $t_1$, and enables the capacitor K1 to discharge via the emitter-collector path of said transistor, the diode n1 and the resistor r2.

When, as assumed, the discharge time constant of the capacitor K1 is considerably greater than the charging time constant of said capacitor, said capacitor and the transistor p1 produce the sawtooth voltage illustrated in the curve b of FIG. 2. The curve of FIG. 2 seems to approximate a section from a cosine curve. It will be traced to the differential feedback via the capacitor K2 and the resistor r2.

As long as the potential at the collector electrode of the first transistor p1 is greater than the potential at a common point B in the connection between the diodes n4 and n3 by at least the threshold level of the diode n3, said diode n3 remains in its nonconductive condition and the second transistor p2 remains in its conductive condition. When the capacitor voltage decreases to a magnitude at which the potential at the cathode of the diode n3 is lower than the potential at the point B, relative to the threshold level of the diode n3, the control current for the second transistor p2 flows through said diode n3. The transistor p2 is consequently switched to its nonconductive condition.

The second transistor p2 is switched to its nonconductive condition very rapidly, since the current flowing through the diode n3 is divided and flows through the first transistor p1 and to the partially discharged first capacitor K1. The control current for the second transistor p2 is thus very rapidly interrupted and results in the production of the desired steepness of the voltage produced at the emitter-collector path of the transistor p2. The output voltage $U_{p2}$ is represented by the ordinate of the curve c of FIG. 2.

The aforedescribed process is repeated in each half period of the alternating voltage. The emitter-collector path of the second transistor p2 thus produces a voltage pulse having a repetition rate which is equal to twice the frequency of the alternating voltage, as shown in the curve c of FIG. 2.

The voltage to which the first capacitor K1 is charged is determined by the magnitude of the reference voltage $U_S$ which is applied to the emitter-collector path of the first transistor p1. The higher the reference voltage the higher the voltage magnitude to which the capacitor K1 is charged. The time required by the capacitor voltage to decrease to a specific magnitude increases in accordance with the increase of the reference voltage. This also increases or lengthens the period of time during which the collector potential of the first transistor p1 decreases to the magnitude of the base potential of the second transistor p2. The instant at which the second transistor p2 is switched to its nonconductive condition, relative to the synchronized alternating voltage $U_N$ or the direct control voltage $U_G$ may thus be clearly determined with the assistance of the magnitude of the reference voltage $U_S$.

As seen in the curve c of FIG. 2, the second transistor p2 is switched to its nonconductive condition later and later, as the reference voltage $U_S$ increases in magnitude. This results in the voltage pulse produced at the output of the second transistor p2 becoming shorter and shorter in duration. If a relatively high reference voltage $U_{S1}$ is utilized, as shown in the curve b of FIG. 2, the output voltage pulse of the second transistor p2 commences at the instant $t_2$, as shown in the curve c of FIG. 2. The pulse, as does the next-succeeding pulse, terminates at the instant $t_4$, as shown in the curves b and c of FIG. 2, which is the instant at which the first transistor p1 is switched to its nonconductive condition.

The control pulses produced by the pulse generator of the present invention thus have a duration which is $180°-\alpha$, wherein $\alpha=\omega\, t_2$ or $\alpha=\omega\, t_3$.

It is particularly advantageous to control the power of an n-phase load by utilizing n pulse generators of the type of the present invention, if a controllable rectifier is connected in each of the n-phase connections. FIG. 3 is a block diagram of the utilization of three pulse generators of the present invention to control a three-phase load. A pulse generator R of the type of the present invention is provided for the R-phase, a pulse generator S of the type of the present invention is provided for the S-phase and a pulse generator T of the type of the present invention is provided for the T-phase.

Each of the pulse generators R, S and T of FIG. 3 is supplied with the voltage between the corresponding phase connection and the ground or neutral point of the load, delivered as a synchronized voltage. The reference voltage $U_S$ is equally applied to all the pulse generators R, S and T.

While the invention has been described by means of a specific example and in a specific embodiment, I do not wish to be limited thereto, for obvious modifications will occur to those skilled in the art without departing from the spirit and scope of the invention.

We claim:

1. A pulse generator for producing a synchronous pulse sequence with alternating voltage and adjustable phase angle, said pulse generator comprising a first diode;
a first capacitor connected in series circuit arrangement with said first diode;
a first transistor having emitter, collector and base electrodes, a control path and an emitter-collector path connected in parallel with said series circuit arrangement;
a first resistor connected at one end to a common point in the connection between said series circuit arrangement and the emitter-collector path of said first transistor, said first diode having a polarity path whereby said first capacitor is charged through said first resistor when said first transistor is in its nonconductive condition;
a second resistor;
a second diode connected in series circuit arrangement with said second resistor, said last-mentioned series circuit arrangement being connected in parallel with said first diode, said second diode having a polarity whereby said first capacitor may discharge through said second diode, said second resistor and the emitter-collector path of said first transistor;

a source of unidirectional control voltage, said source of control voltage and said second resistor being connected in parallel with the control path of said first transistor, said source of control voltage having output terminals providing a rippled control direct voltage from a source of alternating voltage;

coupling means coupling the other end of the first resistor to an output terminal of the source of control voltage;

a source of reference direct voltage;

a third diode, the emitter-collector path of said first transistor being connected to said source of reference direct voltage in parallel through said third diode, said third diode having a polarity whereby the voltage to which said first capacitor will charge is limited to the magnitude of said reference direct voltage;

a second transistor having emitter, collector and base electrodes and a control path;

another resistor connected between the collector electrode of the second transistor and the coupling means thereby connecting said second transistor to said output terminal of said source of control voltage;

a fourth diode connected in series circuit arrangement with the control path of said second transistor, said fourth diode passing a control current for switching said second transistor to its conductive condition; and a fifth diode, the emitter-collector path of said first transistor being connected to said last-mentioned series circuit arrangement in parallel through said fifth diode, said fifth diode having a polarity whereby the control current will drain off through said fifth diode when the emitter-collector voltage of said first transistor is less than a specific magnitude determined by the threshold magnitude of said fourth diode and the control path of said second transistor.

2. A pulse generator as claimed in claim 1, further comprising a controllable semiconductor device coupled to the collector electrode of said second transistor, and a load, and wherein the source of alternating voltage of said source of unidirectional control voltage is connected to said controllable semiconductor device via said load.

3. A pulse generator as claimed in claim 1, further comprising an n-phase load having n-phase connections and a common neutral point, a plurality of controllable semiconductor devices each connected in a corresponding one of said phase connections, a source of controllable direct reference voltage, and n additional pulse generators as claimed in claim 1, wherein each of said pulse generators is connected to a corresponding one of said controllable semiconductor devices and said source of reference voltage is coupled to each of said pulse generators.

4. A pulse generator as claimed in claim 2, wherein said controllable semiconductor device comprises a semiconductor controlled rectifier.

5. A pulse generator as claimed in claim 2, wherein said controllable semiconductor device comprises a Triac.

6. A pulse generator as claimed in claim 3, wherein each of said controllable semiconductor devices comprises a semiconductor controlled rectifier connected to the collector electrode of the second transistor of the corresponding one of said pulse generators.

7. A pulse generator as claimed in claim 3, wherein each of said controllable semiconductor devices comprises a Triac connected to the collector electrode of the second transistor of the corresponding one of said pulse generator.

8. A pulse generator as claimed in claim 3, wherein the source of alternating voltage of said source of unidirectional control voltage is connected between the neutral point of said n-phase load and each of the phase connections of said n-phase load.

* * * * *